Feb. 9, 1971 — R. H. DEMBAR — 3,561,146
PHOTOGRAPH DISPLAY APPARATUS
Filed Aug. 5, 1969 — 2 Sheets-Sheet 1

INVENTOR
ROBERT H. DEMBAR
ATTORNEYS

Feb. 9, 1971 R. H. DEMBAR 3,561,146
PHOTOGRAPH DISPLAY APPARATUS
Filed Aug. 5, 1969 2 Sheets-Sheet 2

INVENTOR
ROBERT H. DEMBAR
BY
ATTORNEYS

United States Patent Office 3,561,146
Patented Feb. 9, 1971

3,561,146
PHOTOGRAPH DISPLAY APPARATUS
Robert H. Dembar, Croton, N.Y., assignor to
Graphicana Corp., Ossining, N.Y.
Filed Aug. 5, 1969, Ser. No. 847,696
Int. Cl. G09f 1/12
U.S. Cl. 40—152                                    5 Claims

ABSTRACT OF THE DISCLOSURE

The present invention pertains to a photograph display apparatus and more particularly to a device for mounting and displaying photographic prints and other desired pictorial representations. The apparatus comprises a translucent outer member preferably formed of plastic whose geometric configuration is that of a polyhedron and an inner opaque member preferably formed of resilient polyurethane foam and having a conformal configuration with that of the outer member and adapted to be removably inserted within said outer member with photographs positionally secured between the abutting surfaces of said complementary polyhedrons.

BACKGROUND OF THE INVENTION

The present invention pertains to a new and novel apparatus for displaying photographic prints or other desired pictorial representations, wherein a viewer's attention is immediately drawn to the apparatus, and more particularly the photographic prints, when the viewer is in view of the apparatus.

SUMMARY

It is, therefore, the primary object of the present invention to provide a new and novel photograph display apparatus which is capable of having photographic prints easily positioned therein and which is aesthetically very appealing.

It is a further object of the present invention to provide a photograph display apparatus which is in the form of a polyhedron and has a plurality of display surfaces.

It is yet another object of the present invention to provide a photograph display apparatus of the aforementioned type comprising a translucent outer member and an inner member adapted to be removably inserted within said outer member.

It is still a further object of the present invention to provide a photograph display apparatus of the aforementioned type wherein the outer member is formed of a rigid plastic material, such as polystyrene, and the inner member is formed of a resilient inner member, such as polyurethane foam.

BRIEF DESCRIPTION OF THE DRAWINGS

These and other objects, features and advantages of the present invention will become more apparent from the detailed description hereinafter considered in conjunction with the accompanying drawings wherein.

DESCRIPTION OF THE PREFERRED EMBODIMENTS

Figure 1:
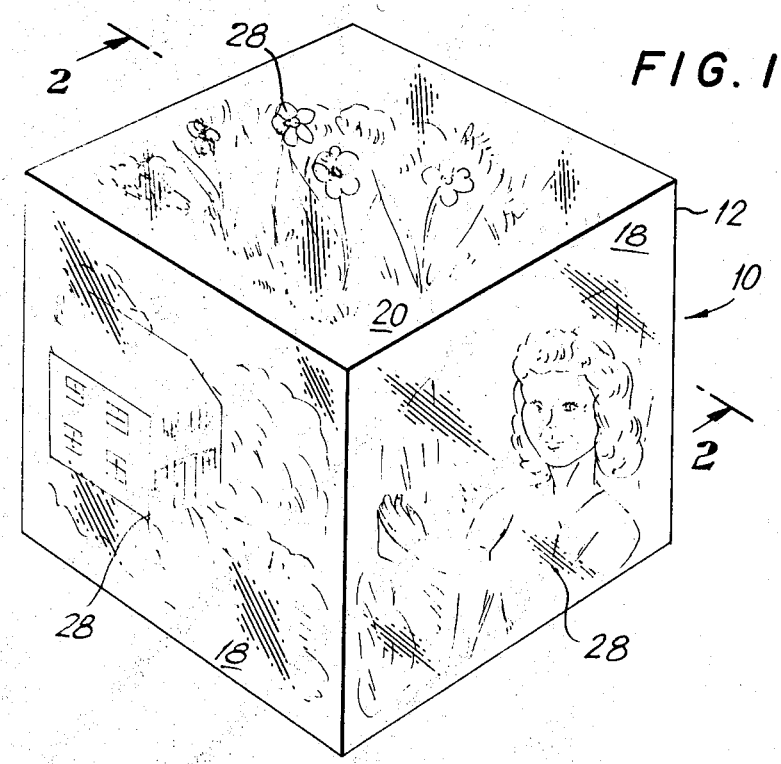
FIG. 1 is a perspective view of one embodiment of the photograph display apparatus of the present invention depicting a cubical configuration of the apparatus.
Figure 2:
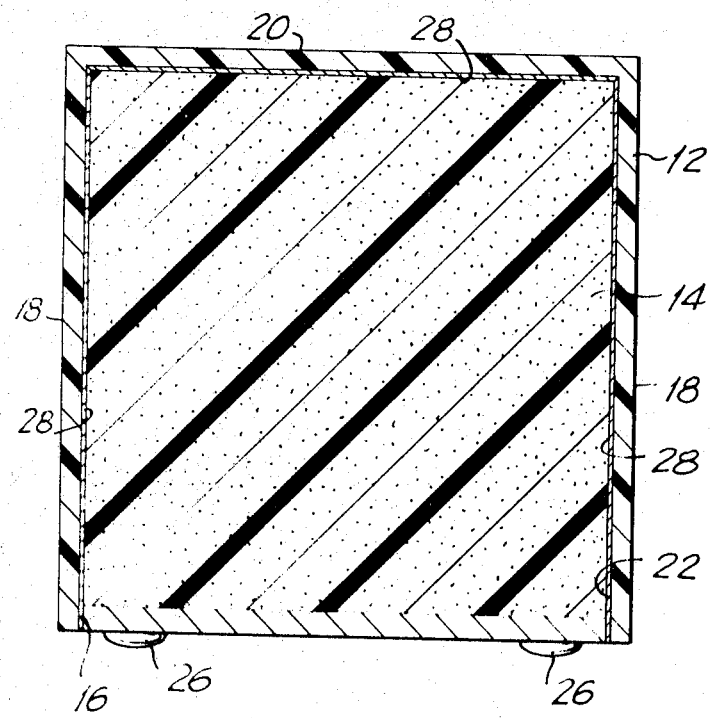
FIG. 2 is a sectional view of the apparatus taken on the line 2—2 of FIG. 1.

Referring now to FIGS. 1 and 2, there is shown a photograph display apparatus 10 having a rectangular, and more particularly, a square polyhedron form resulting in a cubical configuration, and constructed in accordance with the principles of the present invention to form a first embodiment thereof.

The apparatus 10 comprises an outer member 12, an inner member 14, and mar-proof base means for precluding marring and scratching the surface upon which the apparatus is placed. The outer member 12 is preferably formed as an integral member and is preferably fabricated of a translucent, and more particularly a transparent, plastic material, e.g., polystyrene. However, it will be appreciated by those skilled in the art that other suitable materials which are translucent may also be utilized and the member 12 need not be formed as an integral member, although the same is highly preferable. The outer member 12 is not a true polyhedron in that the bottom 16 thereof is open, the purpose of which will become more apparent hereinafter.

The member 12 includes four sides 18 and a top portion 20, all of which are of equal dimensions so that the resultant configuration is a regular polyhedron, as opposed to an irregular polyhedron which results when the sides 18 are not of equal dimensions. This construction is, of course, contemplated herein and the resultant configuration would be a rectangular polyhedron.

The inner member 14 is preferably formed as an integral member and is preferably fabricated of a resilient plastic material; e.g., polyurethane foam. However, it will be readily apparent to those skilled in the art that the member 14 may also be fabricated from other suitable materials.

It is also to be noted that the inner member 14 is preferably opaque and of a dark color so as to provide a suitable background for the photographs to be displayed by the apparatus 10, as will be discussed in more detail hereinafter.

The inner member 14 is formed having a configuration which is conformal with the interior void 22 formed by the sides 18 and top 20 of the outer member 12, so that the member 14 may easily be inserted and removed from the void 22 due to the resiliency of the member.

The dimensions of the inner member 14 may be, if desired substantially the same as that of the interior void 22 except that the height thereof is slightly less than that of the interior void 22. This enables the assembly 10 to be closed-off from the external environment of the apparatus 10 by means of a bottom cover member 24 and prevent dirt, dust, humidity and other undesirable elements from permeating into the interior of the apparatus.

The cover member 24 is preferably formed of a substantially rigid plastic material which can be easily snapped or pushed into the bottom portion of the apparatus 10 within the interior void 22 and which can also be easily snapped out of position therein.

As shown in FIG. 2, and if desired, the cover member 24 may be provided with tips 26, formed integrally therewith or which may be made of rubber and secured to the cover member 24 as by means of an adhesive or some other equally suitable means, so as to provide a base upon which the apparatus 10 may rest when in use.

It is herein to be noted that the provision of a cover member 24 having tips 26 is not essential to the apparatus 10 in that the inner member 14 may be formed having the precise same height as the interior void 22 or may be formed slightly shorter than the height thereof. In these instances the apparatus 10 will rest upon the bottom edges of the sides 18 and the bottom of the inner member 14 or merely on the bottom edges of the sides 18. Moreover, the cover member may also be fabricated without tips and of the same or similar translucent material as that of the outer member 12 and thus serve as a top cover member.

In the use of the photograph display apparatus 10, the cover member 24 is first removed and the inner member 14 is then entirely or partially removed from the interior void formed by the outer member 12, and more particularly by the sides 18 and top 20 thereof. Photographic prints 28 are then positioned directly upon the planar faces of the sides and top of the inner member 14 and the inner member 14 is then reinserted within the interior void 22 and the cover member 24 is then snapped back in place at the bottom of the apparatus 10. The photographic prints 28, or other desired pictorial representations, are then positioned in abutting engagement between the outer surfaces of the inner member 14 and the inner surfaces of the outer member 12. The resiliency of the inner member 14 serves to urge the prints 28 against the inner surfaces of the outer member 12, thereby positionally securing said photogaphic prints between the respective members 12 and 14.

It is herein to be noted that although the photographic prints 28 have herein been illustrated as having dimensions equal to that of the sides 18 and top 20 of the outer member 12, in many applications of the apparatus 10, the prints 28 will have dimensions which are less than those of the sides 18 and top 20. It is for these applications that it is desirable that the inner member 14 be fabricated of a dark color opaque material, so as to provide a proper backdrop for viewing the prints 28.

It is thus seen that the apparatus 10 provides a display capable of illustratively storing a plurality of photographic prints concurrently. More specifically when the polyhedron has the faces, including the top and bottom thereof, the apparatus 10 is capable of simultaneously displaying $n-l$ photographic prints.

Figure 3:
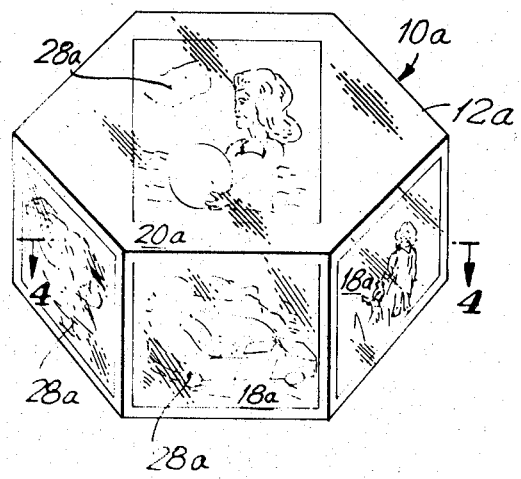
FIG. 3 is a perspective view of a second embodiment of the photograph display apparatus of the present invention depicting an hexagonal polyhedron.
Figure 4:
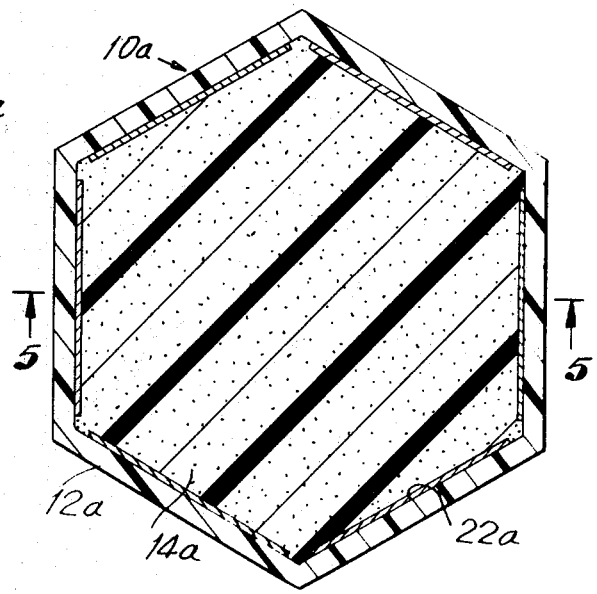
FIG. 4 is a sectional view of the apparatus taken on line 4—4 of FIG. 3.
Figure 5:
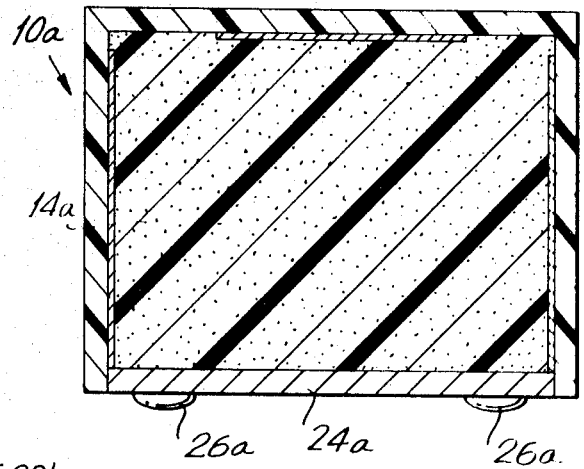
FIG. 5 is a sectional view taken on the line 5—5 of FIG. 4.

A second embodiment of the present invention is depicted in FIGS. 3–5, wherein similar parts are denoted by similar reference numerals.

Referring now to FIGS. 3–5, there is shown a regular hexagonal polyhedron photographic display apparatus denoted generally by the reference numeral 10a. The apparatus 10a includes an outer member 12a having six sides 18a and a top 20a and is fabricated of a translucent and substantially rigid plastic material, although it is also possible to fabricate the same from glass.

An inner member 14a conformal with the interior void 22a of the outer member 12a is disposed therewithin. Photographic prints 28a are positionally disposed between the outer surfaces of the inner member 14a and the inner surfaces of the outer member 12a.

In this embodiment, it is to be noted, the photographic prints 28a are of smaller dimensions than the sides 18a or the top 20a, whereby the dark opaque inner member 14a provides an aesthetically appealing background for the prints 28a.

As best seen in FIG. 5, the apparatus 10a is provided with a bottom cover member 24a having tips 26a.

Figure 6:
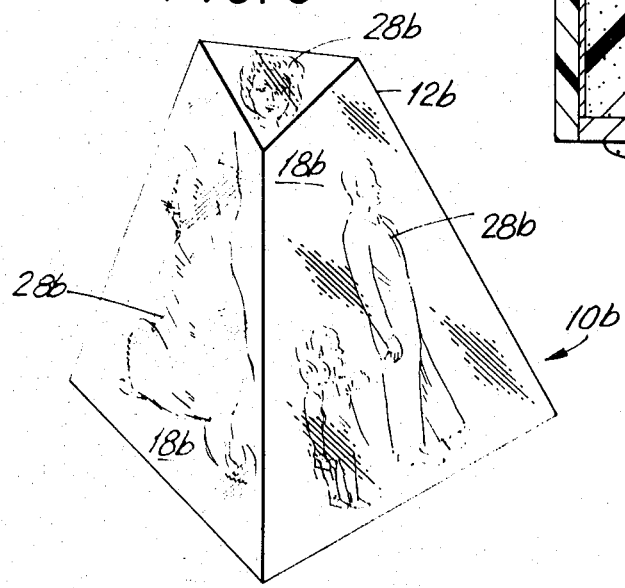
FIG. 6 is a perspective view of a third embodiment of the photograph display apparatus of the present invention depicting a truncated triangular polyhedron.

A third embodiment of the present invention is depicted in FIG. 6, wherein similar parts are denoted by similar reference numerals.

In this embodiment the photographic display apparatus 10b is in the form of a truncated prism, wherein the sides 18b of the outer member 12b are trapezoidal while the top 20b is triangular. Thus, the prints 28b may have the same configuration as that of the sides and top (as shown) or may have a more standard square or rectangular configuration whose dimensions are such as to enable the same to be displayed by the surfaces of the apparatus.

It is herein to be noted that the term polyhedron as utilized in the foregoing description is intended to describe any solid geometric configuration, truncated or otherwise, having three or more surfaces which surfaces are either planar, concavely arcuate, convexly arcuate or any combination thereof.

It is thus seen that I have provided a new and novel photograph display apparatus having a multitude of geometric forms, which can be easily and simply manufactured and which is aesthetically pleasing.

What is claimed is:

1. A photographic apparatus capable of displaying more than four photographic prints or other pictorial representations comprising a hollow rigid, transparent plastic outer member of substantially polyhedral configuration, said outer member having a plurality of sides and having a closed top end and an open end diametrically opposite to said closed end, an opaque, substantially solid and resilient inner member of the same outer configuration as said outer member being adapted to be removably disposed within said hollow outer member, said photographic prints or other pictorial representations being abuttingly urged and held flush in a substantially immovable position against the closed top end and the side walls of said hollow outer member by the surfaces of said resilient inner member, whereby all of said prints or representations may be visually displayed at one time, and marproof base means disposed at said open end of said hollow outer member so that said photographic display apparatus may be placed on furniture without marring or scratching same.

2. The photographic apparatus according to claim 1, wherein said mar-proof base means comprises a cover member removably associated with the open end of said polyhedral outer member.

3. The photographic apparatus according to claim 2, wherein said cover member is provided with at least three tips or legs.

4. The photographic apparatus according to claim 3, wherein said hollow outer member is formed as an integral member.

5. The photographic apparatus according to claim 4, wherein said inner resilient member is formed of a polyurethane foam, and said transparent plastic outer member is made of polystryrene.

References Cited

UNITED STATES PATENTS

| | | | |
|---|---|---|---|
| 173,286 | 2/1876 | Hepineuze | 40—19 |
| 531,924 | 1/1895 | Gibson | 40—19UX |
| 1,636,500 | 7/1927 | Cox | 40—19UX |
| 2,548,706 | 4/1951 | Corning | 40—100X |
| 2,572,454 | 10/1951 | Down et al. | 40—152X |

FOREIGN PATENTS

| | | | |
|---|---|---|---|
| 944,484 | 12/1948 | France | 40—152.1 |

ROBERT W. MICHELL, Primary Examiner

W. J. CONTRERAS, Assistant Examiner

U.S Cl. X.R.

40—10